(12) United States Patent
Yashiro et al.

(10) Patent No.: US 10,819,007 B2
(45) Date of Patent: Oct. 27, 2020

(54) DISPLAY DEVICE

(71) Applicant: SHARP KABUSHIKI KAISHA, Sakai, Osaka (JP)

(72) Inventors: Yuhji Yashiro, Sakai (JP); Yasuhiro Sugita, Sakai (JP); Makoto Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/575,748

(22) PCT Filed: May 19, 2016

(86) PCT No.: PCT/JP2016/064892
§ 371 (c)(1),
(2) Date: Nov. 20, 2017

(87) PCT Pub. No.: WO2016/186169
PCT Pub. Date: Nov. 24, 2016

(65) Prior Publication Data
US 2018/0294546 A1    Oct. 11, 2018

(30) Foreign Application Priority Data

May 21, 2015   (JP) ................................. 2015-103716

(51) Int. Cl.
*H01Q 1/24*       (2006.01)
*H01Q 7/00*       (2006.01)
(Continued)

(52) U.S. Cl.
CPC ............. *H01Q 1/24* (2013.01); *H01Q 1/2208* (2013.01); *H01Q 1/243* (2013.01); *H01Q 7/00* (2013.01);
(Continued)

(58) Field of Classification Search
CPC .. H01Q 1/2208; H01Q 1/2216; H01Q 1/2225; H01Q 1/24; H01Q 1/241;
(Continued)

(56) References Cited

U.S. PATENT DOCUMENTS

| 8,749,390 | B2* | 6/2014 | Eray ........................ H01Q 7/00 |
| | | | 340/572.5 |
| 9,543,642 | B2* | 1/2017 | Kato ........................ H01Q 1/38 |

(Continued)

FOREIGN PATENT DOCUMENTS

| EP | 1868263 A1 | 12/2007 |
| GB | 2431053 A | 4/2007 |

(Continued)

*Primary Examiner* — Dimary S Lopez Cruz
*Assistant Examiner* — Patrick R Holecek
(74) *Attorney, Agent, or Firm* — ScienBiziP, P.C.

(57) ABSTRACT

Provided is a display device that ensures both of the conductivity for realizing the antenna function and the light transmissivity for transmitting light that forms a video image displayed on the display device, and at the same, allows short-range wireless communication to be performed in a wide range in a display section of the display device. A display device 100 includes a display panel 3, an antenna pattern 4 for driving, and antenna patterns 5A, 5B for propagation. The antenna driving unit drives the antenna pattern 4 for driving, at predetermined carrier wave frequency, whereby the antenna pattern 4 for driving and the antenna pattern 5A or 5B for propagation are electromagnetically coupled. As a result, proximity wireless communication can be performed in a wide range of a display area AR1 of the display device 100.

15 Claims, 12 Drawing Sheets

(51) Int. Cl.
*H04B 5/00* (2006.01)
*H01Q 1/22* (2006.01)

(52) U.S. Cl.
CPC ......... *H04B 5/0031* (2013.01); *H04B 5/0087* (2013.01)

(58) Field of Classification Search
CPC .......... H01Q 1/242; H01Q 1/243; H01Q 7/00; H04B 5/0031; H04B 5/0087; G06F 3/041; G06F 3/0412; G06K 7/10009; G06K 7/10178; G06K 19/07794; G09G 3/2092; G09G 2370/16
See application file for complete search history.

(56) References Cited

U.S. PATENT DOCUMENTS

| | | | |
|---|---|---|---|
| 2010/0302039 A1 | 12/2010 | Goto et al. | |
| 2015/0255856 A1* | 9/2015 | Hong | H01Q 1/243 343/702 |

FOREIGN PATENT DOCUMENTS

| | | |
|---|---|---|
| JP | 2010-268190 A | 11/2010 |
| JP | 2010-278518 A | 12/2010 |
| JP | 2011-066610 A | 3/2011 |
| JP | 2011-066692 A | 3/2011 |
| JP | 2011-091744 A | 5/2011 |
| WO | 2005/022686 A1 | 3/2005 |
| WO | 2014/030440 A1 | 2/2014 |
| WO | 2014/030773 A1 | 2/2014 |

* cited by examiner

DISPLAY DEVICE

TECHNICAL FIELD

The present invention relates to a display device that includes an antenna pattern for short-range wireless communication in a region where an image or the like is to be displayed (display area).

BACKGROUND ART

In recent years, the following technique is often used: between an IC card (contactless IC card) that does not include a power source and incorporates an antenna element for wireless communication, and a communication device that includes a power source, short-range communication is performed, without the short-range communication IC card and the communication device being brought into contact with each other. For example, in a case where wireless communication (short-range communication) is performed between the communication device and the contactless IC card, the contactless IC card is brought close to the communication device, to such an extent that the distance between the antenna element of the communication device and the contactless IC card is equal to or less than a predetermined distance. The communication device includes a power source, and power is supplied to the antenna element for short-range wireless communication incorporated in the communication device, whereby a magnetic field is generated by the antenna element. Then, by the magnetic field generated by the communication device when the contactless IC card is brought close to the communication device, induced current is caused to flow through the antenna element of the contactless IC card. Thus, electric power can be supplied from the communication device to the contactless IC card. Then, the contactless IC card causes a circuit (for example, an IC chip) in the contactless IC card to operate, with use of the electromotive force generated by the induced current. In this way, by bringing the contactless IC card close to the communication device, wireless communication (short-range communication) can be performed between the contactless IC card and the communication device.

Commonly, an antenna element is often made of a metal having a high conductivity (copper or silver) in order to ensure conductivity. Such a metal does not transmit light, and therefore, if the antenna element is formed in the display section of the display device that displays an image or a video image, light that forms an image or a video image is blocked by the antenna element.

To solve such a problem, JP-A-2011-066610, for example, discloses a technique of forming a mesh-type antenna pattern on a transparent substrate so as to ensure both of the conductivity for realizing the antenna function and the transparency.

SUMMARY OF THE INVENTION

Problem to be Solved by the Invention

With the technique disclosed in JP-A-2011-066610, however, only a single antenna pattern is formed on the transparent substrate, and therefore, in a case where, for example, short-range wireless communication is performed with use of the technique disclosed in JP-A-2011-066610, the communication can be carried out only in a narrow range where the antenna pattern is formed.

In light of the above-described problem, it is an object of the present invention to provide a display device that ensures both of the conductivity for realizing the antenna function and the light transmissivity for transmitting light that forms a video image displayed on the display device, and at the same, allows short-range wireless communication to be performed in a wide range in a display section of the display device.

Means to Solve the Problem

To solve the above-described problem, the first configuration is a display device that includes a display panel, an antenna pattern for driving, a matching unit, an antenna driving unit, and an antenna pattern for propagation.

The display panel is intended to display an image.

The matching unit performs impedance matching adjustment for the antenna pattern for driving.

The antenna driving unit drives the antenna pattern for driving, at a predetermined carrier wave frequency f0.

The antenna pattern for propagation is arranged so that at least a part of the antenna pattern for propagation is included in a display area of the display panel when viewed in a plan view, at such a position that the antenna pattern for propagation can be electromagnetically coupled with the antenna pattern for driving.

Effect of the Invention

With the present invention, it is possible to provide a display device that is capable of ensuring both of the conductivity for realizing the antenna function and the light transmissivity for transmitting light that forms a video image displayed on the display device, and at the same, allowing short-range wireless communication to be performed in a wide range in a display section of the display device.

M0DE FOR CARRYING OUT THE INVENTION

Embodiment 1

Figure 1:
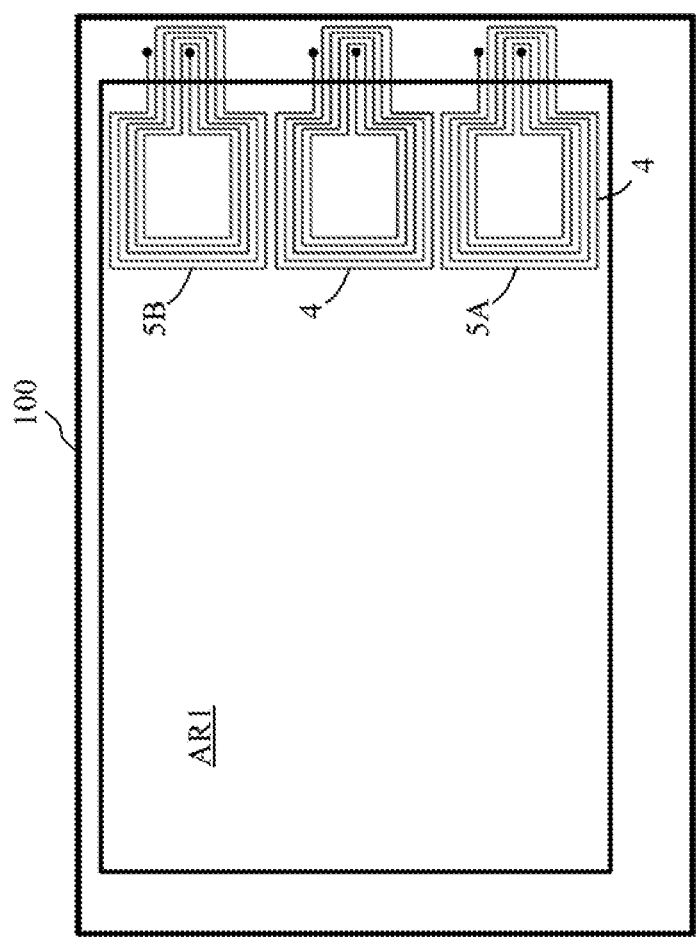
FIG. 1 schematically illustrates a schematic configuration of a display device 100 according to Embodiment 1.

The following description describes Embodiment 1, while referring to the drawings.

<1.1: Configuration of Display Device>

FIG. 1 schematically illustrates a configuration of a display device 100 according to Embodiment 1 (one example). More specifically, FIG. 1 is a plan view illustrating the display device 100 (a plan view viewed from above the display surface).

Figure 2:
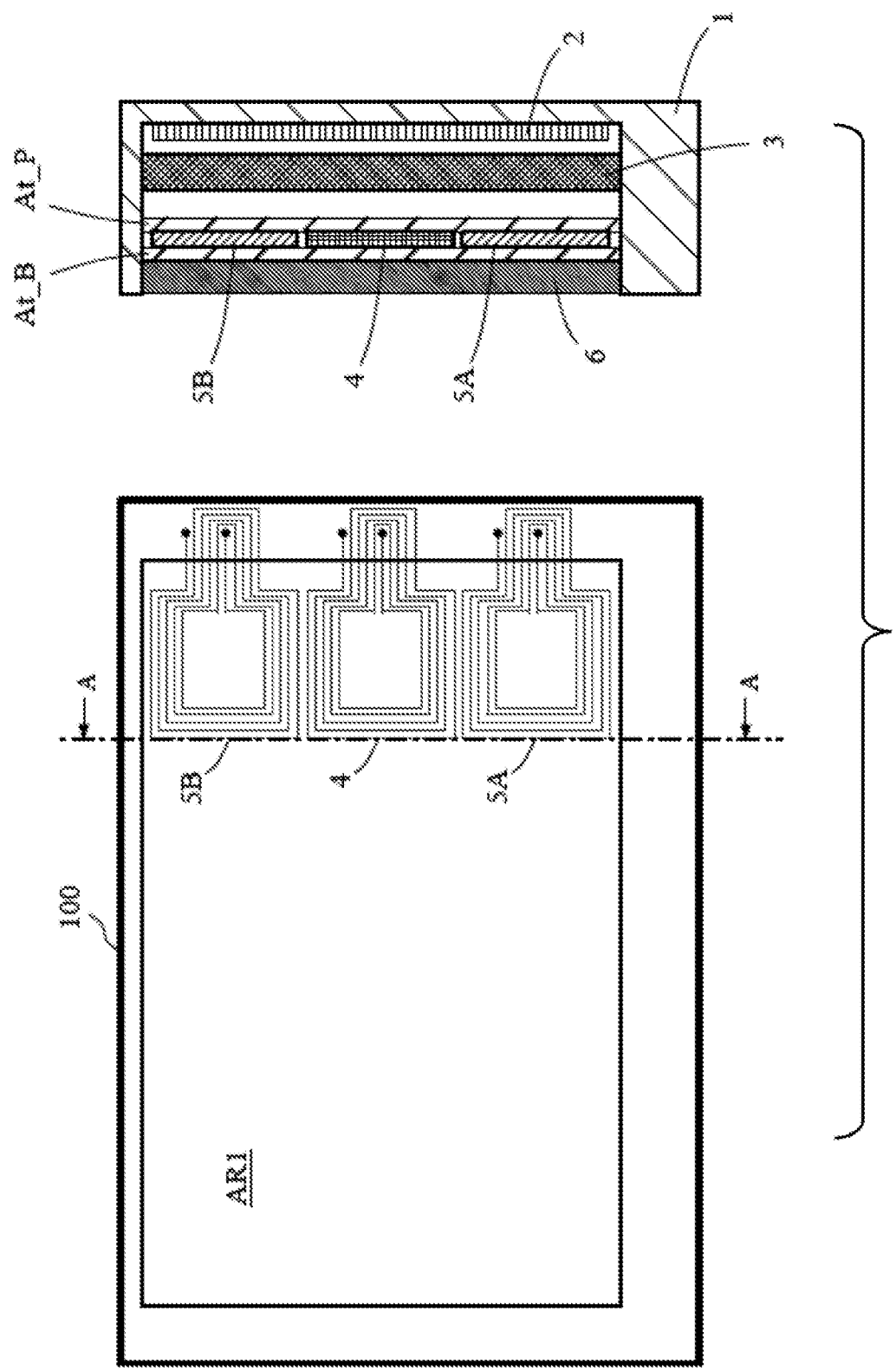
FIG. 2 illustrates a plan view of the display device 100, and an A-A cross-sectional view of the display device 100 taken along line A-A.

FIG. 2 illustrates a plan view of the display device 100, and an A-A cross-sectional view of the display device 100 taken along line A-A (the right diagram).

As illustrated in FIGS. 1 and 2, the display device 100 includes a case 1, a circuit unit 2, a display panel 3, an antenna pattern 4 for driving, antenna patterns 5A, 5B for propagation, a cover 6, an antenna layer substrate At_B, and an antenna protecting member At_P.

Figure 3:
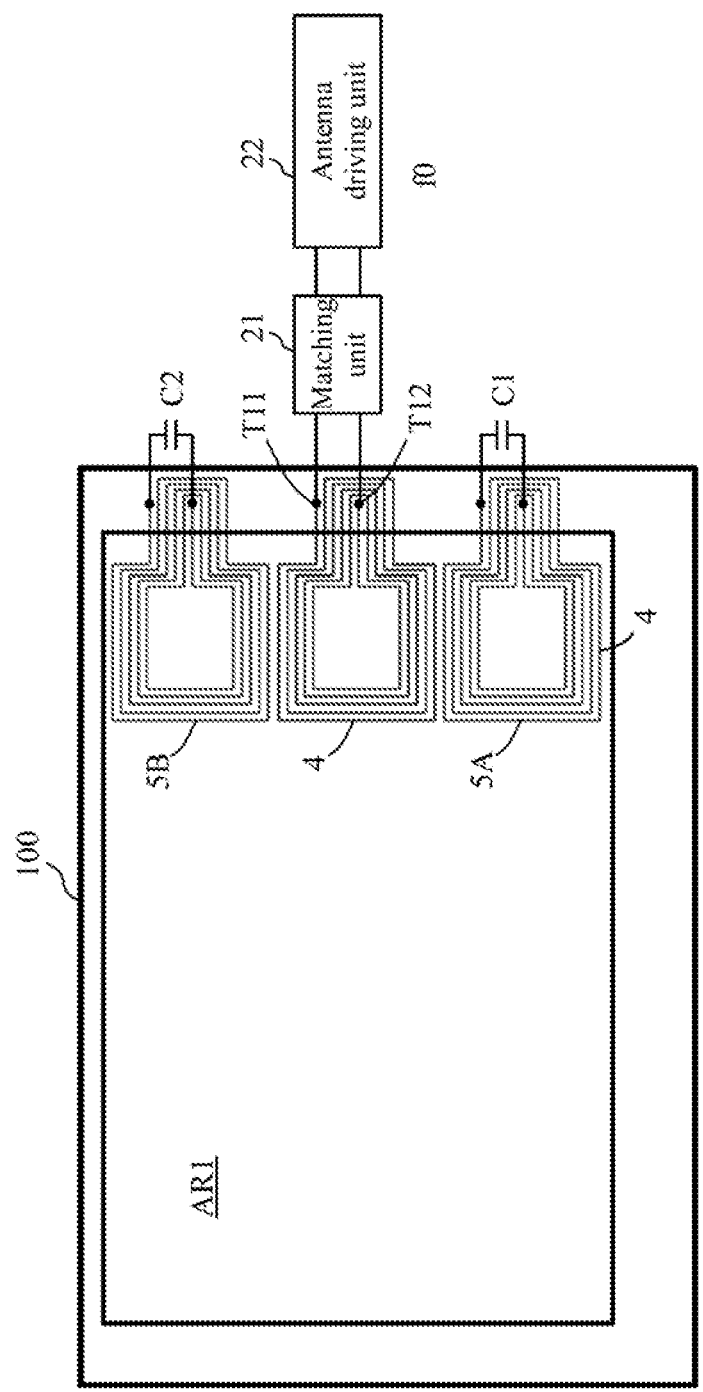
FIG. 3 schematically illustrates a configuration of an antenna pattern 4 for driving, antenna patterns 5A, 5B for propagation, a matching unit 21, an antenna driving unit 22, and capacitors C1, C2 of the display device 100.

FIG. 3 schematically illustrates a configuration of the antenna pattern 4 for driving, the antenna patterns 5A, 5B for propagation, a matching unit 21, an antenna driving unit 22, and capacitors C1, C2 of the display device 100.

As illustrated in FIG. 2, the case 1 is configured so as to be able to house therein the circuit unit 2 including a circuit board, a battery, and the like, the display panel 3 (for example, a liquid crystal display panel device), the antenna pattern 4 for driving, and the antenna patterns 5A, 5B for propagation.

Further, as illustrated in FIG. 2, a transparent cover 6 (a cover 6 formed with an insulation material) is attached to the case 1, so that dirt, dust and the like is prevented from entering the inside.

The circuit unit 2 includes a circuit board, and various types of circuits are formed on the circuit board. The circuit unit 2 includes, for example, the matching unit 21 and the antenna driving unit 22 illustrated in FIG. 3.

The matching unit 21 includes a circuit that performs impedance adjustment (an impedance adjustment circuit) and the like. The impedance adjustment circuit of the matching unit 21 is connected with the antenna pattern 4 for driving through connection terminals T11, T12 with the antenna pattern 4 for driving, to perform the impedance adjustment.

The antenna driving unit 22 is connected with the matching unit 21, as illustrated in FIG. 3. The antenna driving unit 22 drives the antenna pattern 4 for driving through the matching unit 21. The antenna driving unit 22 outputs an RF signal generated by performing a modulation processing operation with respect to a predetermined carrier wave frequency by a predetermined modulation method, via the matching unit 21 to the antenna pattern 4 for driving. Besides, the antenna driving unit 22 executes a predetermined demodulation processing operation to an RF signal received through the antenna pattern 4 for driving and the matching unit 21, and acquires a signal contained in the received RF signal (data and the like).

The display panel 3 is, for example, a display panel in which liquid crystal, organic EL, or the like is used (a liquid crystal display panel or an organic EL display panel). The display panel 3 is connected to a display panel control unit (not shown), so that the driving of the same is controlled by the display panel control unit. With the driving of the display panel 3 controlled by the display panel control unit, an image of the like, for example, is displayed on the display panel 3.

As illustrated in FIG. 2, the display panel 3 is arranged, when viewed in the cross section, between the circuit unit 2 in which the circuit board, the battery and the like are housed, and the transparent cover 6 (for example, the cover 6 made of transparent glass or the like).

The antenna pattern 4 for driving is, for example, an antenna pattern formed on the display panel 3, having a conductor pattern in a shape of a rectangular loop pattern when viewed in a plan view, as illustrated in FIGS. 1 to 3. The antenna pattern 4 for driving is, for example, configured so that the conductor pattern forms such a spiral pattern that the size increases gradually from the inside outward (for example, an approximately rectangular pattern), as illustrated in FIGS. 1 to 3. The shape, the size, the material and the like of the conductor pattern that forms the antenna pattern 4 for driving are determined so that the antenna pattern 4 for driving has a resonance frequency of f1 [Hz].

The antenna pattern 4 for driving is connected with the matching unit 21 through two terminals of the antenna pattern 4 for driving, as illustrated in FIG. 3.

The antenna pattern 4 for driving may be formed with a transparent electrode layer such as an indium tin oxide (ITO) layer, or alternatively, a mesh metal pattern (for example, a thin line pattern made of copper or silver) formed on a transparent layer. The antenna pattern 4 for driving, for example, is formed on the antenna layer substrate At_B, and is protected by the antenna protecting member At_P, as illustrated in FIG. 2. The antenna layer substrate At_B, and the antenna protecting member At_P, are formed with, for example, polyethylene terephthalate (PET) that is transparent (has a high light-transmittance).

The antenna pattern 5A for propagation is, for example, an antenna pattern formed on the display panel 3, having a conductor pattern in a shape of a rectangular loop pattern when viewed in a plan view, as illustrated in FIGS. 1 to 3. The antenna pattern 5A for propagation is, for example, configured so that the conductor pattern forms such a spiral pattern that the size increases gradually from the inside outward (for example, an approximately rectangular pattern), as illustrated in FIGS. 1 to 3. The shape, the size, the material and the like of the conductor pattern that forms the antenna pattern 5A for propagation are determined so that the antenna pattern 5A for propagation has a resonance frequency of f2a [Hz].

Regarding the antenna pattern 5A for propagation, the capacitor C1 is connected between two terminals of the antenna pattern 5A for propagation, as illustrated in FIG. 3.

The antenna pattern 5A for propagation may be formed with a transparent electrode layer such as an indium tin oxide (ITO) layer, or alternatively, a mesh metal pattern (for example, a thin line pattern made of copper or silver) formed on a transparent layer.

The antenna pattern 5B for propagation is, for example, an antenna pattern formed on the display panel 3, having a conductor pattern in a shape of a rectangular loop pattern when viewed in a plan view, as illustrated in FIGS. 1 to 3. The antenna pattern 5B for propagation is, for example, configured so that the conductor pattern forms such a spiral pattern that the size increases gradually from the inside outward (for example, an approximately rectangular pattern), as illustrated in FIGS. 1 to 3. The shape, the size, the material and the like of the conductor pattern that forms the antenna pattern 5B for propagation are determined so that the antenna pattern 5B for propagation has a resonance frequency of f2b [Hz].

Regarding the antenna pattern 5B for propagation, the capacitor C2 is connected between two terminals of the antenna pattern 5B for propagation, as illustrated in FIG. 3.

The antenna pattern 5B for propagation may be formed with a transparent electrode layer such as an indium tin oxide (ITO) layer, or alternatively, a mesh metal pattern (for example, a thin line pattern made of copper or silver) formed on a transparent layer.

The cover 6 is made of a transparent insulation material. The cover 6 is installed on the case 1 as illustrated in FIG. 2, thereby preventing dirt, dust, and the like from entering the inside of the display device 100.

<1.2: Operation of Display Device>

The following description describes operations of the display device 100 configured as described above.

It should be noted that the following description, for convenience of description, describes a case where, by bringing a contactless IC card having an antenna element for short-range wireless communication close to the display device 100, wireless communication (proximity wireless communication) is executed between the display device 100 and the contactless IC card.

Further, the driving frequency of the antenna driving unit 22 of the display device 100 is given as f0 [Hz]. In other words, the carrier wave frequency of the RF signal generated by the antenna driving unit 22 is given as f0 [Hz].

Further, in the display device 100, as illustrated in FIG. 3, the matching unit 21 is connected to the antenna pattern 4 for driving, the inductance value of the antenna pattern 4 for driving is given as L0, and the resonance frequency of the antenna pattern 4 for driving, which is determined by the inductance value L0 of the antenna pattern 4 for driving and the impedance value of the matching unit 21 connected to the antenna pattern 4 for driving is given as f1 [Hz].

Figure 4:
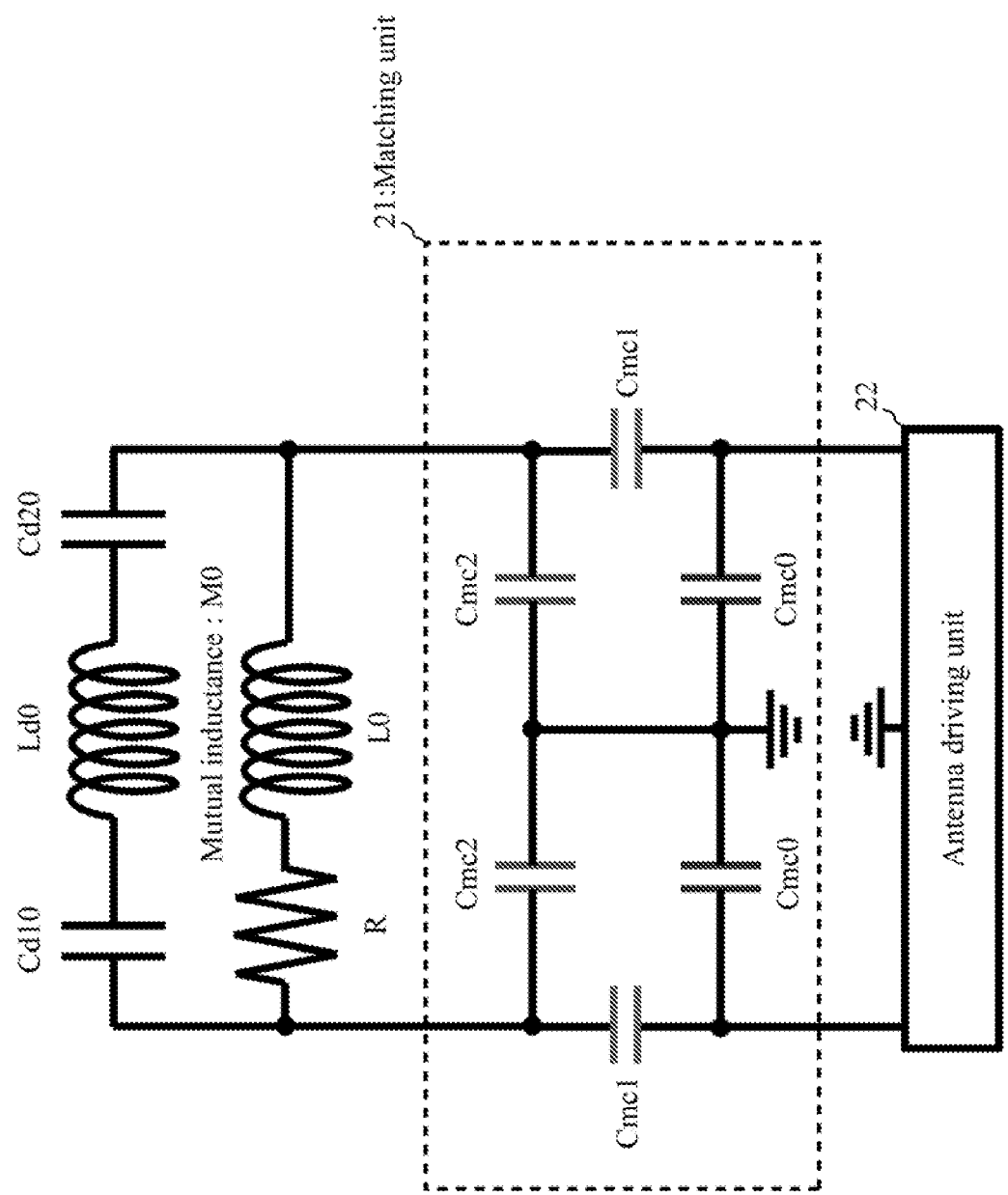
FIG. 4 illustrates an exemplary circuit configuration of the matching unit 21.

FIG. 4 illustrates an exemplary circuit configuration of the matching unit 21. In FIG. 4, the antenna pattern 4 for driving is presented as an equivalent circuit of the antenna pattern 4 for driving. In FIG. 4, the capacitance values of the display panel 3 (display) and the antenna pattern 4 for driving are given as Cd10 and Cd20, respectively, the self-inductance value of the display panel 3 (display) is given as Ld0, the mutual inductance value of the antenna pattern 4 for driving and the display panel 3 (display) is given as M0, and the self-inductance value of the antenna pattern 4 for driving is given as L0.

In the circuit illustrated in FIG. 4, the capacitance value of each capacitor of the matching unit 21 and the inductance value L0 of the antenna pattern 4 for driving are determined so that the antenna pattern 4 for driving has a resonance frequency of f1 [Hz]. In other words, the matching unit 21, which is composed of a capacitor designed so that the equivalent circuit in FIG. 4 has a resonance frequency of f1 [Hz], is connected to the antenna pattern 4 for driving.

In the display device 100, as illustrated in FIG. 3, the capacitor C1 is connected to the antenna pattern 5A for propagation, and the capacitor C2 is connected to the antenna pattern 5B for propagation.

Figure 5:
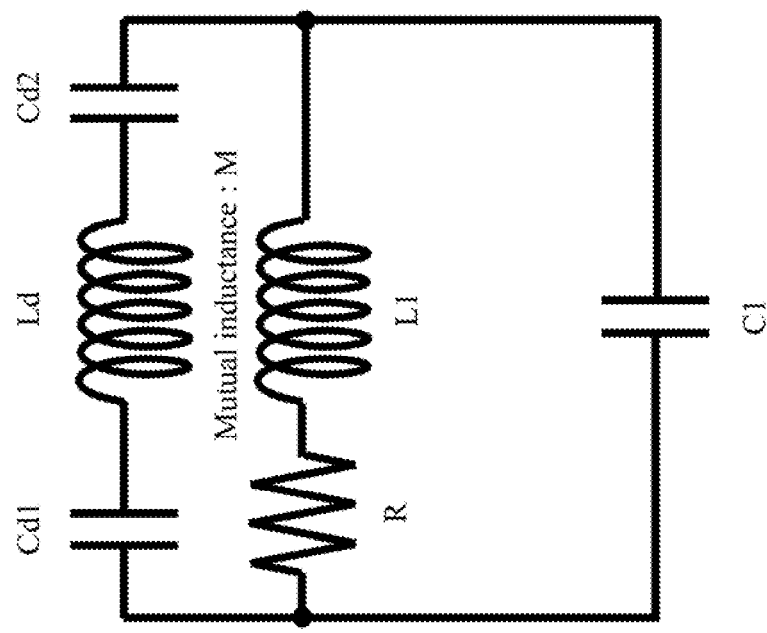
FIG. 5 illustrates an equivalent circuit in a case where the capacitor C1 is connected to the antenna pattern 5A for propagation.

FIG. 5 illustrates an equivalent circuit in a case where the capacitor C1 is connected to the antenna pattern 5A for propagation. In FIG. 5, the capacitance values of the display panel 3 (display) and the antenna pattern 5A for propagation are given as Cd1 and Cd2, respectively, the self-inductance value of the display panel 3 (display) is given as Ld, the mutual inductance value of the antenna pattern 5A for propagation and the display panel 3 (display) is given as M, and the self-inductance value of the antenna pattern 5A for propagation is given as L1.

Here, the capacitance value C1 of the capacitor C1 connected to the antenna pattern 5A for propagation is determined so that the antenna pattern 5A for propagation has a resonance frequency of f2a [Hz]. In other words, the capacitor C1 with which the equivalent circuit in FIG. 5 has a resonance frequency of f2a [Hz] is connected to the antenna pattern 5A for propagation.

Further, regarding the antenna pattern 5B for propagation as well, based on the same principal as above, the capacitance value C2 of the capacitor C2 connected to the antenna pattern 5B for propagation is determined so that the antenna pattern 5B for propagation has a resonance frequency of f2b [Hz]. In other words, the capacitor C2 with which the equivalent circuit in FIG. 5 (the circuit in the case of the antenna pattern 5B for propagation) has a resonance frequency of f2b [Hz] is connected to the antenna pattern 5B for propagation.

Hereinafter, for convenience of description, a case where the following is satisfied is described:

$f2a = f2b.$

It should be noted that the resonance frequencies f2a and f2b do not have to be the same value.

Then, it is assumed that the driving frequency f0 [Hz] of the antenna driving unit 22, the resonance frequency f1 of the antenna pattern 4 for driving, and the resonance frequency f2(=f2a=f2b) of the antenna patterns 5A, 5B for propagation satisfy:

$f0 < f1 < f2.$

For convenience of description, the following description is based on the assumption that the frequencies f0, f1, and f2 have the following values:

$f0 = 13.56$ [MHz], $f1 = 14.15$ [MHz], and $f2 = 14.60$ [MHz].

Figure 6:
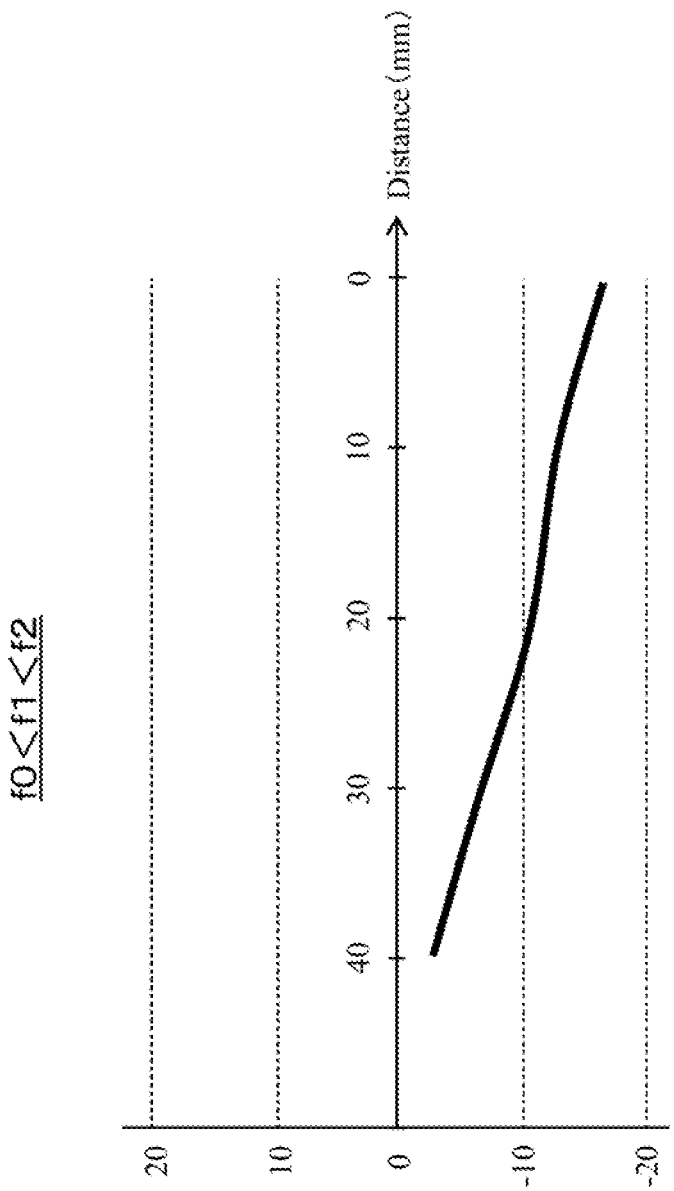
FIG. 6 is a graph that illustrates the relationship between the distance between the antenna pattern 5A for propagation (or the antenna pattern 5B for propagation) and a contactless IC card, and the amount of change in the impedance of the antenna pattern 4 for driving, at 13.56 [MHz], in a case where the contactless IC card is brought close to an area of the display device 100 where the antenna pattern 5A for propagation (or the antenna pattern 5B for propagation) is arranged.

FIG. 6 is a graph that illustrates the relationship between the distance between the antenna pattern 5A for propagation (or the antenna pattern 5B for propagation) and a contactless IC card, and the amount of change in the impedance of the antenna pattern 4 for driving, at 13.56 [MHz], when the contactless IC card is brought close to an area of the display device 100 where the antenna pattern 5A for propagation (or the antenna pattern 5B for propagation) is arranged, under the conditions described above. It should be noted that the resonance frequency of the antenna element incorporated in the contactless IC card is a frequency equal to f0, or a frequency in the vicinity of f0 (for example, f0±0.3×f0).

As is clear from FIG. 6, in a case where the frequencies f0, f1, and f2 are set as described above, the impedance at the driving frequency f0 (=13.56 [MHz]) of the antenna pattern 4 for driving decreases, as the contactless IC card is brought close to the antenna pattern 5A for propagation (or the antenna pattern 5B for propagation). In other words, in this case, when the contactless IC card is brought close to the antenna pattern 5A for propagation (or the antenna pattern 5B for propagation), electric current sufficient to generate a magnetic field flows through the antenna pattern 4 for driving. As a result, proximity wireless communication can be carried out between the display device 100 and the contactless IC card via the antenna pattern 4 for driving and the antenna pattern 5A for propagation (or the antenna pattern 5B for propagation).

In this way, in the display device 100, short-range wireless communication can be carried out in a wide range in the display section (the display area AR1 in FIG. 1) of the display device, that is, in the range where the antenna pattern 4 for driving and the antenna pattern 5A or 5B for propagation are formed, by setting the driving frequency f0 [Hz] of the antenna driving unit 22, the resonance frequency f1 of the antenna pattern 4 for driving, and the resonance frequency f2 of the antenna patterns 5A, 5B for propagation so that these satisfy:

$f0<f1<f2.$

Generally, when a coil (an antenna for propagation) that forms an LC circuit for causing radio wave to propagate (causing an electromagnetic field to propagate) is provided between an antenna for driving and an antenna element incorporated in a contactless IC card, the resonance structure among the driving frequency f0 (the carrier wave frequency f0 for wireless communication), the resonance frequency f1 of the antenna for driving, and the resonance frequency f2 of the antenna for propagation changes.

In a case where short-range wireless communication is realized by using the antenna for propagation, the magnitude correlation among the driving frequency f0 (the carrier wave frequency f0 for wireless communication), the resonance frequency f1 of the antenna for driving, and the resonance frequency f2 of the antenna for propagation has to be adjusted. More specifically, in order that short-range wireless communication is carried out with use of the driving frequency f0 (the carrier wave frequency f0 for wireless communication), the driving frequency f0 (the carrier wave frequency f0 for wireless communication), the resonance frequency f1 of the antenna for driving, and the resonance frequency f2 of the antenna for propagation have to be set so that the impedance at the driving frequency f0 of the antenna for driving is reduced when contactless IC card approaches the antenna for propagation.

The inventors of the present application found the following: in the display device 100, the driving frequency f0 [Hz] of the antenna driving unit 22, the resonance frequency f1 of the antenna pattern 4 for driving, and the resonance frequency f2 of the antenna patterns 5A, 5B for propagation are set so as to satisfy:

$f0<f1<f2.$ whereby the impedance at the driving frequency f0 of the antenna for driving can be reduced, when a contactless IC card (a contactless IC card incorporating an antenna element that can resonate at a frequency f0, or a frequency in the vicinity of the frequency f0) approaches the antenna for propagation; this makes it possible to surely realize the short-range wireless communication.

Besides, in the display device 100, the antenna pattern 4 for driving and the antenna patterns 5A, 5B for propagation are formed with (1) a transparent electrode layer such as an ITO layer or the like, or (2) conductor patterns having a mesh structure of thin metal lines made of copper or silver, which are formed in a transparent layer, whereby light transmissivity can be ensured for the display area AR1 of the display device 100 where video images and the like are displayed.

Further, in the display device 100, the driving frequency f0 [Hz] of the antenna driving unit 22, the resonance frequency f1 of the antenna pattern 4 for driving, and the resonance frequency f2 of the antenna patterns 5A, 5B for propagation are set so as to satisfy:

$f1<f2<f0,$ or $f2<f1<f0.$ whereby the impedance at the driving frequency f0 of the antenna for driving is reduced when a contactless IC card (a contactless IC card incorporating an antenna element that can resonate at a frequency f0, or a frequency in the vicinity of the frequency f0) approaches the antenna for propagation.

In the display device 100, therefore, the setting may be made so that the above-described conditions are satisfied.

As is described above, in the display device 100, both of the conductivity for realizing the antenna function and the light transmissivity for transmitting light that forms a video image displayed on the display device can be ensured, and at the same, short-range wireless communication can be performed in a wide range in a display section (display area) of the display device by using an antenna pattern for propagation.

Though the above-described embodiment is described with reference to a case where two antenna patterns for propagation, i.e., the antenna patterns 5A, 5B for propagation, are formed, as illustrated in FIGS. 1 to 3, the configuration is not limited to this. A greater number of antennas for propagation may be provided in the display device 100, so that proximity wireless communication can be executed in a wider range of the display section (display area AR1).

Even in such a case, the resonance frequency of the added antenna pattern for propagation is set to the same value as that of the resonance frequency f2 of the antenna patterns 5A, 5B for propagation, and the setting may be made so as to satisfy:

$f0<f1<f2,$ or $f1<f2<f0,$ or $f2<f1<f0.$

Figure 7:
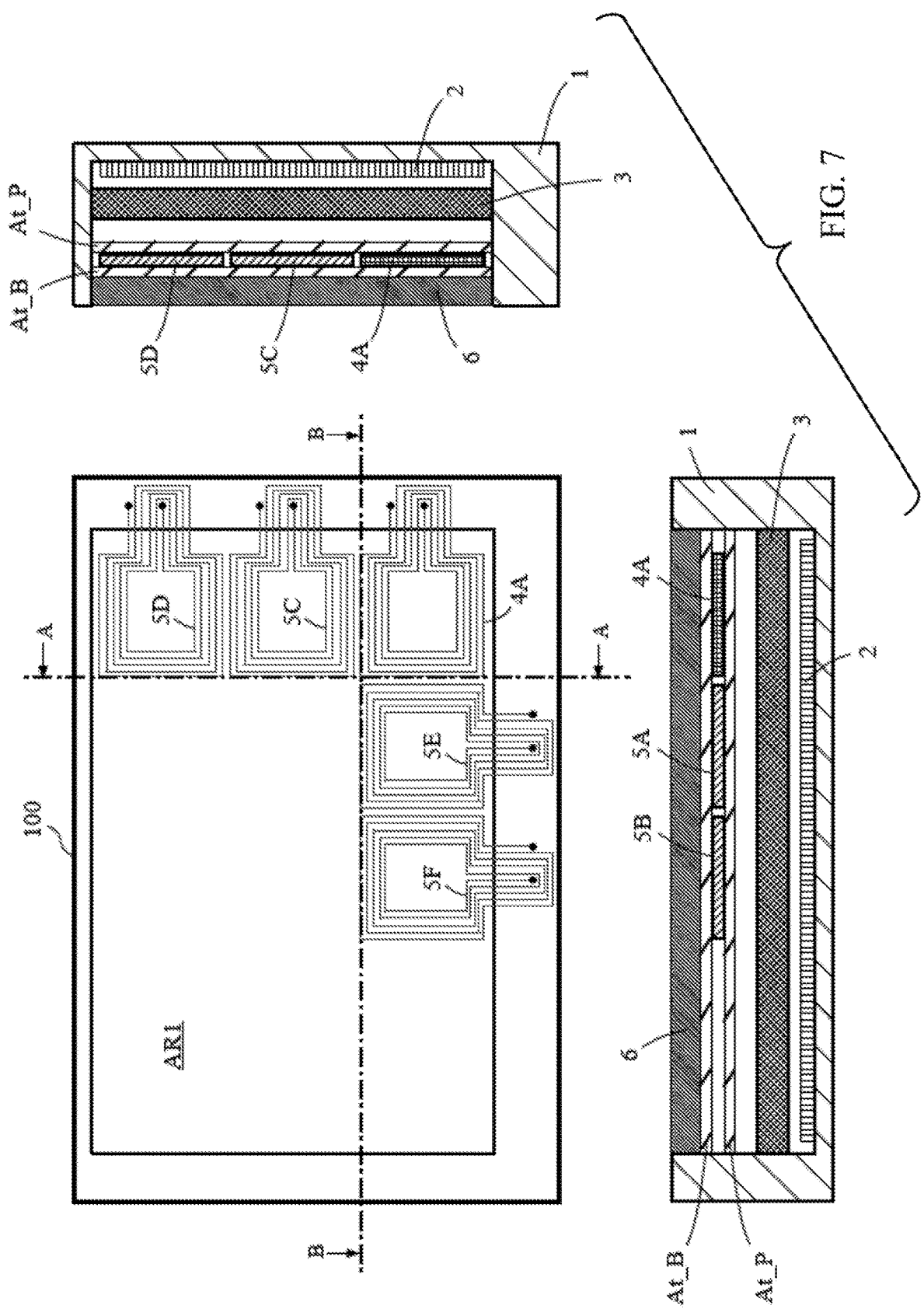
FIG. 7 illustrates a plan view of the display device 100, an A-A cross-sectional view of the display device 100 taken along line A-A, and a B-B cross-sectional view of the same taken along line B-B.
Figure 8:
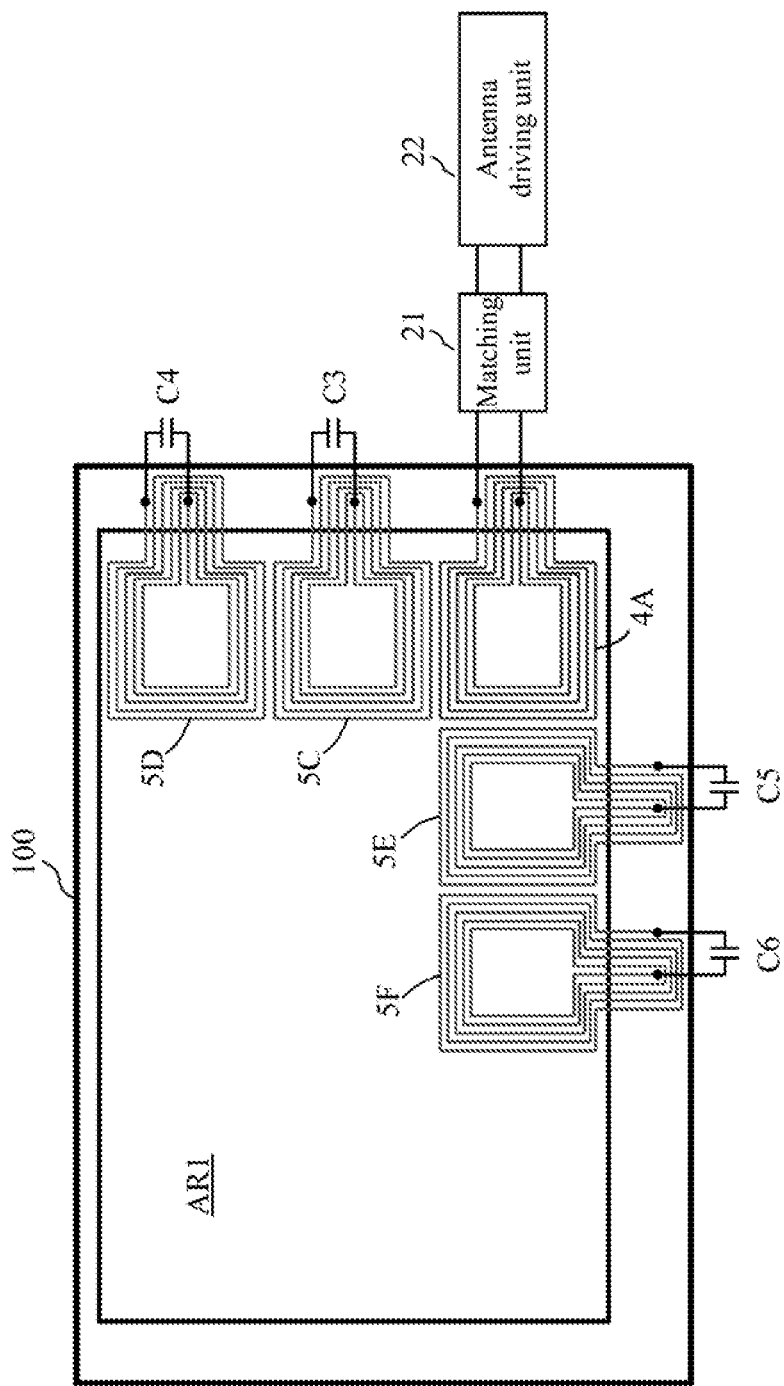
FIG. 8 schematically illustrates a configuration of an antenna pattern 4 for driving, antenna patterns 5C to 5D for propagation, a matching unit 21, an antenna driving unit 22, and capacitors C3 to C6 of the display device 100.

For example, as illustrated in FIGS. 7 and 8, an antenna pattern 4A for driving, and antenna patterns 5C to 5F for propagation may be provided in the display device 100.

In FIG. 7, a plan view of the display device 100, an A-A cross-sectional view (right diagram) of the same taken along line A-A, and a B-B cross-sectional view (lower diagram) of the same taken along line B-B, are illustrated.

FIG. 8 illustrates a schematic configuration of the antenna pattern 4 for driving, the antenna patterns 5C to 5F for propagation, the matching unit 21, the antenna driving unit 22, and capacitors C3 to C6 of the display device 100.

It should be noted that the antenna patterns 5C to 5F for propagation are connected with the capacitors C3 to C6, respectively, whereby the resonance frequency is set to f2 [Hz].

Further, the above-described embodiment is described with reference to a case where, as illustrated in FIGS. 1 to 7, the antenna pattern 4A for driving and the antenna patterns 5A to 5F for propagation are arranged on the display panel 3, but the configuration is not limited to this. One or a plurality of the antenna pattern 4A for driving and the antenna patterns 5A to 5F for propagation may be formed on a bottom surface of the cover 6.

Still further, the display device 100 may include a touch panel. In a case where the display device 100 includes a touch panel, the display device 100 includes, for example, an X electrode layer (transparent electrode layer) that forms X electrodes of the touch panel, and an X electrode layer (transparent electrode layer) that forms X electrodes of the touch panel, between the display panel 3 and the cover 6.

In a case where the display device 100 includes a touch panel, one or a plurality of the antenna pattern 4A for driving and the antenna patterns 5A to 5F for propagation may be formed on the X electrode layer (the transparent electrode layer), or a Y electrode layer (a transparent electrode layer) in the display device 100.

<<Modification Example 1>>

The following description describes Modification Example 1 of Embodiment 1.

Parts identical to those in Embodiment 1 are denoted by the same reference symbols, and detailed descriptions of the same are omitted.

In the display device 100 of Embodiment 1, the driving frequency f0 [Hz] of the antenna driving unit 22, the resonance frequency f1 of the antenna pattern 4 for driving, and the resonance frequency f2 of the antenna patterns 5A, 5B for propagation are set so as to satisfy:

$f0<f1<f2$.

In the display device of the present modification example, the driving frequency f0 [Hz] of the antenna driving unit 22, the resonance frequency f1 of the antenna pattern 4 for driving, and the resonance frequency f2 of the antenna patterns 5A, 5B for propagation are set so as to satisfy:

$f0<f2<f1$.

In the display device of the present modification example, the frequencies f0, f1, and f2 are set to, for example, the following values:

$f0=13.56$ [MHz], $f1=14.60$ [MHz], and $f2=14.15$ [MHz].

Figure 9:
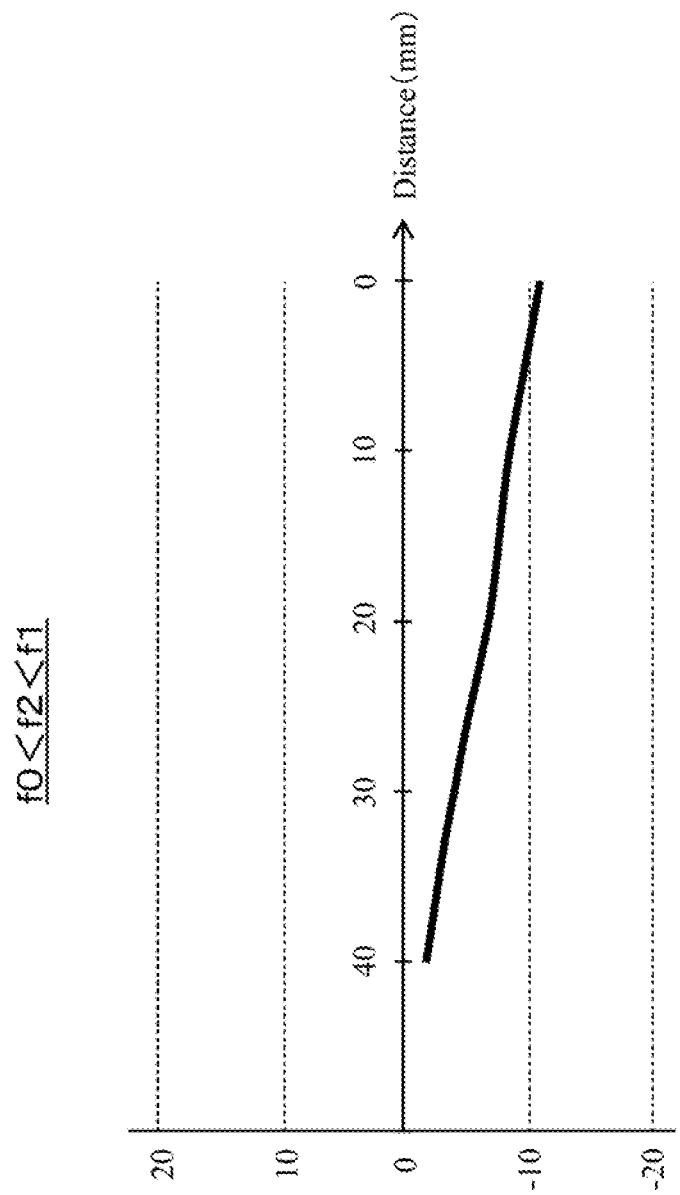
FIG. 9 is a graph that illustrates the relationship between the distance between the antenna pattern 5A for propagation (or the antenna pattern 5B for propagation) and a contactless IC card, and the amount of change in the impedance of the antenna pattern 4 for driving, at 13.56 [MHz], in a case where the contactless IC card is brought close to an area of the display device 100 where the antenna pattern 5A for propagation (or antenna pattern 5B for propagation) is arranged.

FIG. 9 is a graph that illustrates the relationship between the distance between the antenna pattern 5A for propagation (or the antenna pattern 5B for propagation) and a contactless IC card, and the amount of change in the impedance of the antenna pattern 4 for driving, at 13.56 [MHz], in a case where the contactless IC card is brought close to an area of the display device 100 where the antenna pattern 5A for propagation (or the antenna pattern 5B for propagation) is arranged, in a case where the above-described setting is made.

As is clear from FIG. 9, in a case where the frequencies f0, f1, and f2 are set as described above, the impedance at the driving frequency f0 (=13.56 [MHz]) of the antenna pattern 4 for driving decreases, as the contactless IC card is brought close to the antenna pattern 5A for propagation (or the antenna pattern 5B for propagation). In other words, in this case, when the contactless IC card is brought close to the antenna pattern 5A for propagation (or the antenna pattern 5B for propagation), electric current sufficient to generate a magnetic field flows through the antenna pattern 4 for driving. As a result, proximity wireless communication can be carried out between the display device 100 and the contactless IC card via the antenna pattern 4 for driving and the antenna pattern 5A for propagation (or the antenna pattern 5B for propagation).

In this way, in the display device of the present modification example, short-range wireless communication can be carried out in a wide range in the display section (the display area AR1 in FIG. 1) of the display device, that is, in the range where the antenna pattern 4 for driving and the antenna pattern 5A or 5B for propagation are formed, by setting the driving frequency f0 [Hz] of the antenna driving unit 22, the resonance frequency f1 of the antenna pattern 4 for driving, and the resonance frequency f2 of the antenna patterns 5A, 5B for propagation so that these satisfy:

$f0<f2<f1$.

The inventors of the present application found the following: in the display device of the present modification example, the driving frequency f0 [Hz] of the antenna driving unit 22, the resonance frequency f1 of the antenna pattern 4 for driving, and the resonance frequency f2 of the antenna patterns 5A, 5B for propagation are set so as to satisfy:

$f0<f2<f1$ whereby the impedance at the driving frequency f0 of the antenna for driving can be reduced, when a contactless IC card approaches the antenna for propagation; this makes it possible to surely realize the short-range wireless communication.

Besides, in the display device of the present modification example, the antenna pattern 4 for driving and the antenna patterns 5A, 5B for propagation are formed with (1) a transparent electrode layer such as an ITO layer or the like, or (2) conductor patterns having a mesh structure of thin metal lines made of copper or silver, which are formed on a transparent layer, whereby light transmissivity can be ensured for the display area AR1 of the display device 100 where video images and the like are displayed.

As is described above, in the display device of the present modification example, both of the conductivity for realizing the antenna function and the light transmissivity for transmitting light that forms a video image displayed on the display device can be ensured, and at the same, short-range wireless communication can be performed in a wide range in a display section (display area) of the display device by using an antenna pattern for propagation.

As is the case with Embodiment 1, the display device of the present modification example may further include more antenna patterns for propagation.

Further, as is the case with Embodiment 1, the display device of the present modification example may further include a touch panel (an X electrode layer, a Y electrode layer).

Embodiment 2

The following description describes Embodiment 2.

Parts identical to those in the above-described embodiments are denoted by the same reference symbols, and detailed descriptions of the same are omitted.

Figure 10:
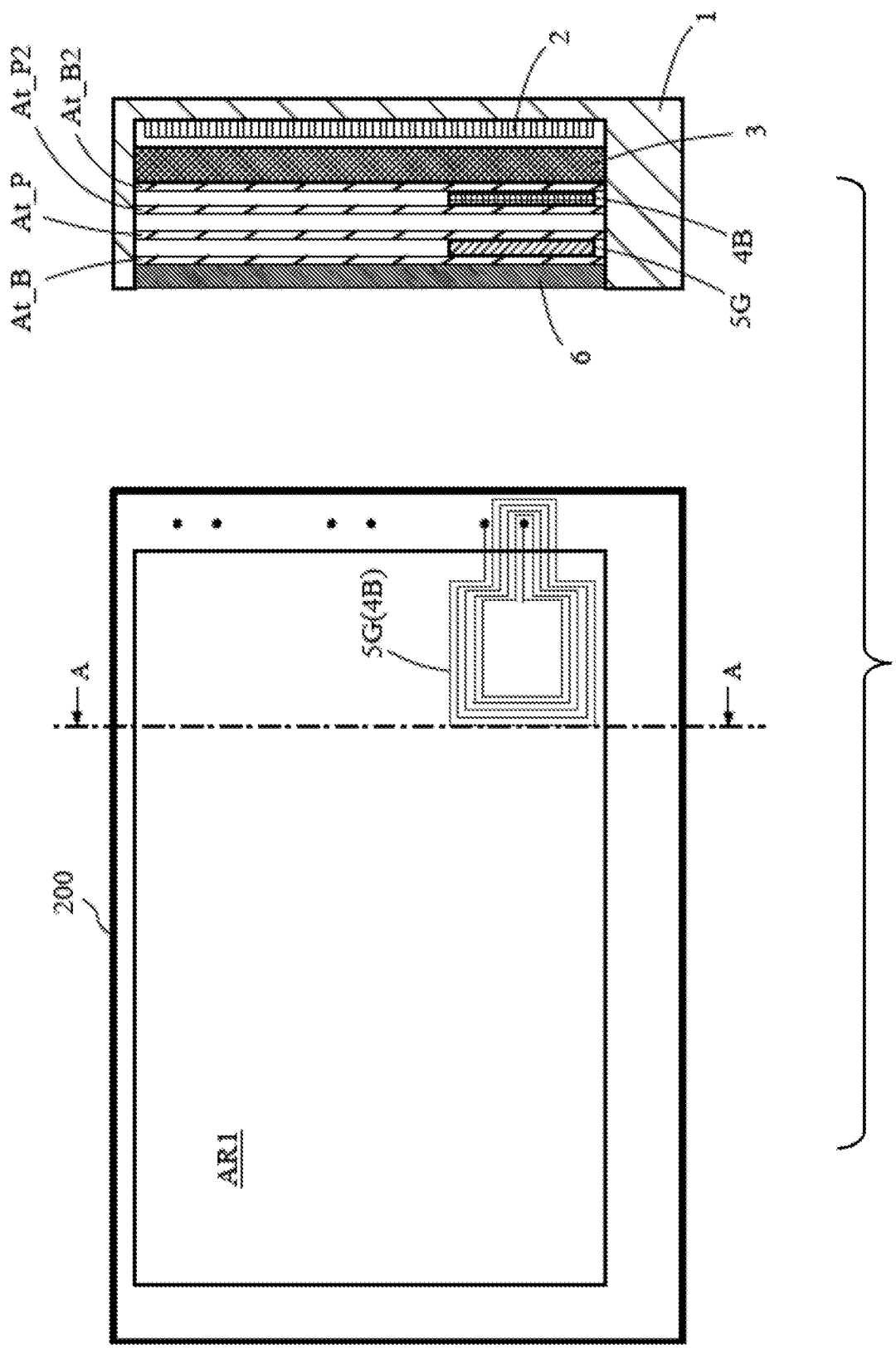
FIG. 10 illustrates a plane view of a display device 200 according to Embodiment 2, and an A-A cross-sectional view of the display device 200 taken along line A-A.

FIG. 10 illustrates a plane view of a display device 200 according to Embodiment 2 (a plan view obtained when the display device 200 is viewed from above the display surface), and an A-A cross-sectional view (right diagram) of the display device 200 taken along line A-A.

Figure 11:
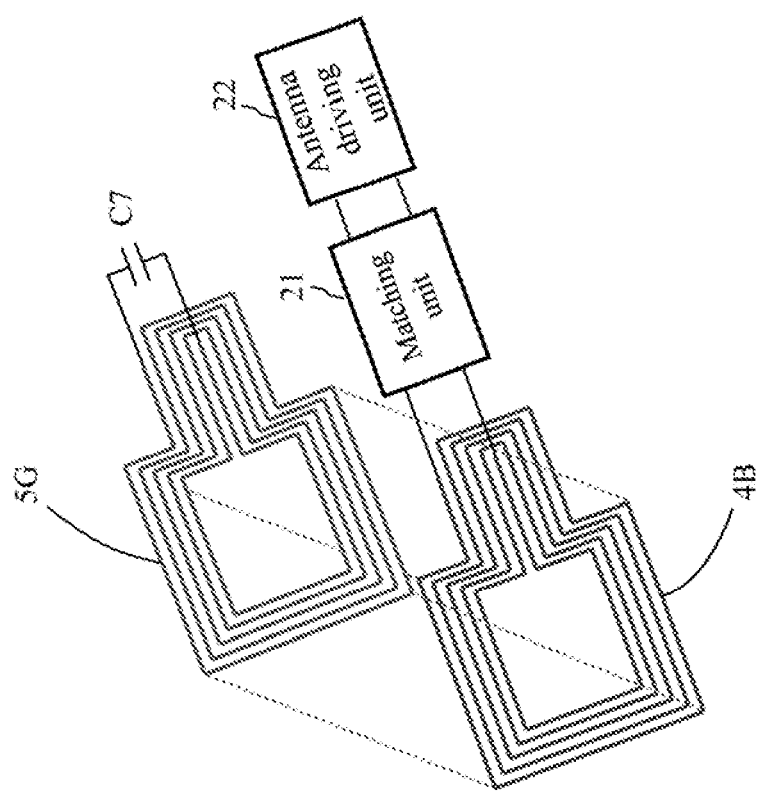
FIG. 11 schematically illustrates a configuration of an antenna pattern 4B for driving, an antenna pattern 5G for propagation, a matching unit 21, an antenna driving unit 22, and a capacitor C7 of the display device 100 (perspective view).

FIG. 11 schematically illustrates a configuration of an antenna pattern 4B for driving, an antenna pattern 5G for propagation, a matching unit 21, an antenna driving unit 22, and a capacitor C7 of the display device 100 (perspective view).

The display device 200 includes a case 1, a circuit unit 2, a display panel 3, an antenna pattern 4B for driving, an antenna pattern 5G for propagation, and a cover 6, as illustrated in FIG. 10.

The antenna pattern 4B for driving is, for example, an antenna pattern formed on the display panel 3, having a conductor pattern in a shape of a rectangular loop pattern when viewed in a plan view, as illustrated in FIG. 10. The antenna pattern 4B for driving is, for example, configured so that the conductor pattern forms such a spiral pattern that the size increases gradually from the inside outward (for example, an approximately rectangular pattern), as illustrated in FIGS. 10 and 11. The shape, the size, the material and the like of the conductor pattern that forms the antenna pattern 4B for driving are determined so that the antenna pattern 4B for driving has a resonance frequency of f1 [Hz].

The antenna pattern 4B for driving is connected with the matching unit 21 through two terminals of the antenna pattern 4 for driving, as illustrated in FIG. 11.

The antenna pattern 4B for driving may be formed with a transparent electrode layer such as an indium tin oxide (ITO) layer, or alternatively, a mesh metal pattern (for example, a thin line pattern made of copper or silver) formed on a transparent layer.

The antenna pattern 4B for driving, for example, is formed on the antenna layer substrate At_B, and is protected by the antenna protecting member At_P, as illustrated in FIG. 10.

The antenna pattern 5G for propagation is, for example, an antenna pattern formed on the bottom surface of the cover 6, having a conductor pattern in a shape of a rectangular loop pattern when viewed in a plan view, as illustrated in FIG. 10. The antenna pattern 5G for propagation is, for example, configured so that the conductor pattern forms such a spiral pattern that the size increases gradually from the inside outward (for example, an approximately rectangular pattern), as illustrated in FIGS. 10 and 11. The shape, the size, the material and the like of the conductor pattern that forms the antenna pattern 5G for propagation are determined so that the antenna pattern 5G for propagation has a resonance frequency of f2a [Hz].

The antenna pattern 5G for propagation, for example, is formed on the antenna layer substrate At_B2, and is protected by the antenna protecting member At_P2, as illustrated in FIG. 10.

In the display device 200, as illustrated in FIGS. 10 and 11, the antenna pattern 4B for driving, and the antenna pattern 5G for propagation, are arranged so as to overlap each other when viewed in a plan view, whereby the magnetic field can be strengthened in a direction from the bottom surface of the display device 200 toward the display surface thereof (the direction of the normal line of the display surface). More specifically, since the direction in which the antenna pattern 4B for driving and the antenna pattern 5G for propagation are electromagnetically coupled whereby the magnetic field is strengthened is the direction from the bottom surface to the display surface of the display device 200 (the direction of the normal line of the display surface), the impedance at the driving frequency f0 of the antenna pattern 4B for driving is reduced, whereby the distance between the contactless IC card and the antenna pattern 5G for propagation, required for realizing short-range wireless communication, can be increased.

In the display device 200 of the present embodiment as well, the driving frequency f0 [Hz] of the antenna driving unit 22, the resonance frequency f1 of the antenna pattern 4B for driving, and the resonance frequency f2 of the antenna pattern 5G for propagation are set so as to satisfy:

$$f0<f1<f2,$$

or $$f0<f2<f1,$$

or $$f1<f2<f0,$$

or $$f2<f1<f0.$$

With this configuration, in the display device 200, proximity wireless communication can be realized by bringing the contactless IC card close to the antenna pattern 5G for propagation.

The display device 200 of the present embodiment may further include more antenna patterns for propagation.

Further, as is the case with Embodiment 1, the display device 200 of the present embodiment may further include a touch panel (an X electrode layer, a Y electrode layer). In this case, the antenna pattern 4B for driving and/or the antenna pattern 5G for propagation may be formed on the X electrode layer, or on the Y electrode layer.

Embodiment 3

The following description describes Embodiment 3.

Parts identical to those in the above-described embodiments are denoted by the same reference symbols, and detailed descriptions of the same are omitted.

Figure 12:
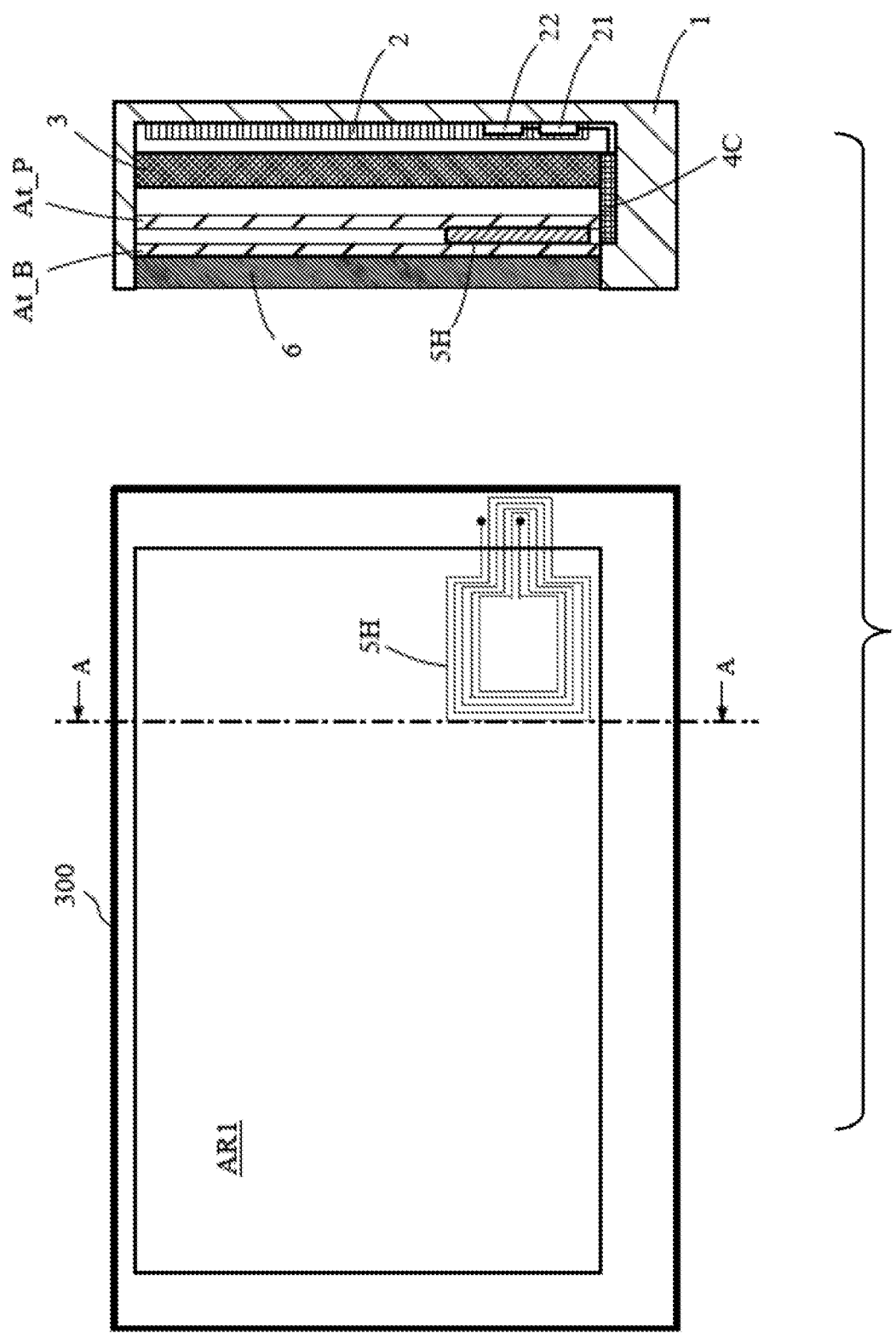
FIG. 12 illustrates a plan view of a display device 300 according to Embodiment 3, and an A-A cross-sectional view of the display device 300 taken along line A-A.

FIG. 12 illustrates a plane view of a display device 300 according to Embodiment 3 (a plan view obtained when the display device 300 is viewed from above the display surface), and an A-A cross-sectional view (right diagram) of the display device 300 taken along line A-A.

The display device 300 includes a case 1, a circuit unit 2 including a matching unit 21 and an antenna driving unit 22, a display panel 3, an antenna pattern 4C for driving, an antenna pattern 5H for propagation, and a cover 6, as illustrated in FIG. 12.

The antenna pattern 4C for driving is provided at such a position that it does not obstruct the display surface of the display panel 3, for example, as illustrated in the right diagram of FIG. 12. More specifically, the antenna pattern 4C for driving is arranged at a position along an internal side wall of the case 1, as illustrated in the right diagram of FIG. 12.

Further, the antenna pattern 4C for driving is connected with the matching unit 21, as illustrated in the right diagram of FIG. 12.

The antenna pattern 4C for driving, is, for example, configured so that a conductor pattern forms such a spiral pattern that the size increases gradually from the inside outward (for example, an approximately rectangular pattern). The shape, the size, the material and the like of the conductor pattern that forms the antenna pattern 4C for driving are determined so that the antenna pattern 4C for driving has a resonance frequency of f1 [Hz].

Since the antenna pattern 4C for driving is provided at such a position that it does not obstruct the display surface of the display panel 3 as illustrated in FIG. 12, it does not have to be a transparent antenna pattern. The antenna pattern 4C for driving, therefore, may be an antenna pattern formed with a conductor pattern of a metal (for example, copper or silver), for example.

It should be noted that the antenna pattern 4C for driving is arranged at such a position that it can be electromagnetically coupled with the antenna pattern 5H for propagation.

The antenna pattern 5H for propagation is, for example, an antenna pattern formed on the bottom surface of the cover 6, having a conductor pattern in a shape of a rectangular loop pattern when viewed in a plan view, as illustrated in FIG. 12. The antenna pattern 5H for propagation is, for example, configured so that the conductor pattern forms such a spiral pattern that the size increases gradually from the inside outward (for example, an approximately rectangular pattern), as illustrated in FIG. 12. The shape, the size, the material and the like of the conductor pattern that forms the antenna pattern 5H for propagation are determined so that the antenna pattern 5H for propagation has a resonance frequency of f2 [Hz].

It should be noted that the antenna pattern 5H for propagation is arranged at such a position that it can be electromagnetically coupled with the antenna pattern 4C for driving.

In the display device 300, as illustrated in FIG. 12, the antenna pattern 4C for driving arranged so as to be along the inner wall of the case 1, and the antenna pattern 5H for propagation, are arranged so that these can be electromagnetically coupled. Besides, in the display device 300, transparency does not have to be ensured in the antenna pattern 4C for driving. In other words, in the display device 300, it is not necessary to use a transparent electrode layer, which makes it possible to realize the antenna pattern 4C for driving, with an inexpensive and high-performance antenna element made of a metal having a high conductivity (for example, copper or silver).

Besides, in display device 300, since the antenna pattern 4C for driving and the antenna pattern 5H for propagation are arranged at such positions that they can be electromagnetically coupled, a magnetic field can be generated in the antenna pattern 5H for propagation by causing the antenna driving unit 22 to drive the antenna pattern 4C for driving, and proximity wireless communication can be carried out by bringing the contactless IC card close to the antenna pattern 5H for propagation.

It should be noted that, in the display device 300 of the present embodiment as well, the driving frequency f0 [Hz] of the antenna driving unit 22, the resonance frequency f1 of the antenna pattern 4C for driving, and the resonance frequency f2 of the antenna pattern 5H for propagation are set so as to satisfy:

$f0<f1<f2$, or $f0<f2<f1$, or $f1<f2<f0$, or $f2<f1<f0$.

With this configuration, in the display device 300, proximity wireless communication can be realized by bringing the contactless IC card close to the antenna pattern 5H for propagation.

The display device 300 of the present embodiment may further include more antenna patterns for propagation.

Further, as is the case with Embodiment 1, the display device 300 of the present embodiment may further include a touch panel (an X electrode layer, a Y electrode layer). In this case, the antenna pattern 5G for propagation may be formed on the X electrode layer, or on the Y electrode layer.

Other Embodiments

A part or all of the above-described embodiments (including the modification example) may be combined so as to realize a display device.

Further, in the foregoing descriptions of the embodiments, among the constituent members thereof, only principal constituent members necessary for the above-described embodiments are indicated in a simplified manner. The above-described embodiments, therefore, can include arbitrary constituent members not clearly indicated in the description of the embodiments. Still further, in the descriptions of the above-described embodiments and the drawings, the size of each member does not necessarily represent a real size, a real dimensional ratio, and the like faithfully. The size, the dimensional ratio, and the like, therefore, can be changed, without departing from the scope of the present invention.

The specific configuration of the present invention is not limited to those of the above-described embodiments, and can be changed and modified variously, without departing from the scope of the invention.

[Supplementary Note]

The present invention can be also described as follows:

The first invention is a display device that includes a display panel, an antenna pattern for driving, a matching unit, an antenna driving unit, and an antenna pattern for propagation.

The display panel is intended to display an image.

The matching unit performs impedance matching adjustment with respect to the antenna pattern for driving.

The antenna driving unit drives the antenna pattern for driving, at a predetermined carrier wave frequency f0.

The antenna pattern for propagation is arranged so that at least a part of the antenna pattern for propagation is included in a display area of the display panel when viewed in a plan view, at such a position that the antenna pattern for propagation can be electromagnetically coupled with the antenna pattern for driving.

In this display device, the antenna pattern for driving is driven by the antenna driving unit at the predetermined carrier wave frequency f0, and the magnetic field generated by the antenna pattern for driving is coupled with the antenna pattern for propagation, whereby a magnetic field for performing short-range wireless communication can be generated in a wide range in a display section of the display device. Using this display device, therefore, makes it possible to perform short-range wireless communication in a wide range in a display section of the display device.

The second invention is the first invention further characterized in that the antenna pattern for driving is arranged so that at least a part of the antenna pattern for driving is included in a display area of the display panel when viewed in a plan view.

With this configuration, in this display device, the antenna pattern for driving can be arranged so that at least a part of the antenna pattern for driving is included in a display area of the display panel when viewed in a plan view.

The third invention is the first or second invention further characterized in that the antenna pattern for driving is formed in a first layer arranged in parallel with the display panel.

The antenna pattern for propagation is formed in a second layer arranged in parallel with the display panel, the second layer being different from the first layer.

With this configuration, in this display device, the antenna pattern for driving can be formed in the first layer arranged in parallel with the display panel, and the antenna pattern for propagation can be formed in the second layer.

The fourth invention is any one of the first to third inventions further characterized in that the antenna pattern for driving has an area that overlaps at least a part of the antenna pattern for propagation when viewed in a plan view.

With this configuration, in this display device, the antenna pattern for driving and the antenna pattern for propagation can be arranged so as to overlap each other when viewed in a plan view, whereby a magnetic field in a predetermined direction can be strengthened. As a result, in this display device, a distance for which proximity wireless communication can be carried out can be increased in the direction in which the magnetic field is strengthened.

The fifth invention is the first invention further characterized in that the antenna pattern for driving is arranged at such a position that the antenna pattern for driving does not block light that forms an image to be displayed by the display panel.

With this configuration, in this display device, there is no need to ensure the transparency of the antenna pattern for driving, which makes it possible to use a metal having a high conductivity (a metal that does not transmit light) or the like to provide an antenna element having high performance inside the display device.

The sixth invention is any one of the first to fifth inventions further characterized in that, in a case where wireless communication is performed with a device as a wireless communication target that has an antenna element having a resonance frequency approximately equal to the predetermined carrier wave frequency f0, (1) the antenna pattern for driving has a resonance frequency of f1 [Hz] when the antenna pattern for driving is connected with the matching unit, and (2) the antenna pattern for propagation has a resonance frequency of f2 [Hz] when the antenna pattern for propagation is connected with a capacitor having a predetermined capacitance value.

The predetermined carrier wave frequency f0, the resonance frequency f1 of the antenna pattern for driving, and the resonance frequency f2 of the antenna pattern for propagation satisfy:

f0<f1<f2, or f0<f2<f1, or f1<f2<f0, or f2<f1<f0.

With this configuration, in this display device, when a device as a wireless communication target (for example, a contactless IC card) approaches the antenna for propagation, the impedance at the driving frequency f0 of the antenna for driving can be reduced, whereby short-range wireless communication can be surely realized.

It should be noted that the configuration indicated by the description of "a resonance frequency approximately equal to the predetermined carrier wave frequency f0" encompasses, for example, a configuration in which the resonance frequency falls in a range of (the carrier wave frequency f0)±0.3×f0.

So that the display device and the device as a wireless communication target (for example, a contactless IC card) can perform wireless communication within a predetermined distance, it is preferable that the predetermined carrier wave frequency f0, the resonance frequency f1 of the antenna pattern for driving, and the resonance frequency f2 of the antenna pattern for propagation are set so as to satisfy the following conditions:

$f0-0.5 \times \Delta f \leq f1 \leq f0+0.5 \times \Delta f,$ $f0-0.5 \times \Delta f \leq f2 \leq f0+0.5 \times \Delta f,$ and $Q=f0/\Delta f$ where Q represents a Q value of an antenna (LC resonance circuit) having a resonance frequency of f0, and of represents a half-value width.

For example, when f0=13.56 [MHz] and Q=1.5, the resonance frequency f1 of the antenna pattern for driving and the resonance frequency f2 of the antenna pattern for propagation are preferably set so as to satisfy:

13.56−4.52 [MHz]≤f1≤13.56+4.52 [MHz], and 13.56−4.52 [MHz]≤f2≤13.56+4.52 [MHz].

The seventh invention is the sixth invention further characterized in that the resonance frequency f1 of the antenna pattern for driving, and the resonance frequency f2 of the antenna pattern for propagation satisfy:

13.56−4.52 [MHz]≤f1≤13.56+4.52 [MHz], and 13.56−4.52 [MHz]≤f2≤13.56+4.52 [MHz].

The eighth invention is any one of the first to seventh inventions further characterized in that the antenna pattern for driving is formed with a transparent electrode that has a transmittance equal to or higher than a predetermined value.

With this configuration, the antenna pattern for driving can be formed with a transparent electrode. As a result, in this display device, the transmittance with respect to light from the display panel is ensured to be equal to or higher than a predetermined value in an area where the antenna pattern for driving is arranged.

The ninth invention is any one of the first to seventh inventions further characterized in that the antenna pattern for driving is formed with a conductor pattern that is formed by arranging a thin line made of a metal in a mesh form.

With this configuration, the antenna pattern for driving can be formed with a mesh-form conductor pattern. As a result, in this display device, the transmittance with respect to light from the display panel is ensured to be equal to or higher than a predetermined value in an area where the antenna pattern for driving is arranged.

The tenth invention is any one of the first to ninth inventions further characterized in that the antenna pattern for propagation is formed with a transparent electrode that has a transmittance equal to or higher than a predetermined value.

According to this configuration, the antenna pattern for propagation can be formed with a transparent electrode. As a result, in this display device, the transmittance with respect to light from the display panel is ensured to be equal to or higher than a predetermined value in an area where the antenna pattern for propagation is arranged.

The eleventh invention is any one of the first to ninth invention further characterized in that the antenna pattern for propagation is formed with a conductor pattern that is formed by arranging a thin line made of a metal in a mesh form.

With this configuration, the antenna pattern for propagation can be formed with a mesh-form conductor pattern. As a result, in this display device, the transmittance with respect to light from the display panel is ensured to be equal to or higher than a predetermined value in an area where the antenna pattern for propagation is arranged.

INDUSTRIAL APPLICABILITY

With the present invention, it is possible to provide a display device that ensures both of the conductivity for realizing the antenna function and the light transmissivity for transmitting light that forms a video image displayed on the display device, and at the same, allows short-range wireless communication to be performed in a wide range in a display section of the display device. The present invention, therefore, is useful in the field of the display device-related industries, and can be implemented in this field.

DESCRIPTION OF REFERENCE NUMBERS

100, 200, 300: display device
1: case
2: circuit unit
21: matching unit
22: antenna driving unit
3: display panel
4, 4A, 4B, 4C: antenna pattern for driving
5, 5A, 5B, 5C, 5D, 5E, 5F, 5G, 5H: antenna pattern for propagation

The invention claimed is:
1. A display device comprising:
a display panel for displaying an image;
an antenna pattern for driving;
a matching unit configured to perform impedance matching adjustment with respect to the antenna pattern for driving;
an antenna driving unit configured to drive the antenna pattern for driving, at a predetermined carrier wave frequency $f0$; and
at least two antenna patterns for propagation,
wherein each of the antenna patterns for propagation is arranged so that al least a part of each of the antenna patterns for propagation is included in a display area of the display panel when viewed in a plan view, at such a position that each of the antenna patterns for propagation can be electromagnetically coupled with the antenna pattern for driving,
the antenna patterns for propagation are disconnected with each other, each of the antenna patterns for propagation is formed in a spiral pattern,
none of the antenna patterns for propagation is wired with the antenna driving unit, and the antenna patterns for propagation are disposed on a same plane.

2. The display device according to claim 1,
wherein the antenna pattern for driving is arranged so that at least a part of the antenna pattern for driving is included in a display area of the display panel when viewed in a plan view.

3. The display device according to claim 1,
wherein the antenna pattern for driving is formed in a first layer arranged in parallel with the display panel, and
the antenna patterns for propagation are formed in a second layer arranged in parallel with the display panel, the second layer being different from the first layer.

4. The display device according to claim 1,
wherein the antenna pattern for driving has an area that overlaps at least a part of the antenna patterns for propagation when viewed in a plan view.

5. The display device according to claim 1,
wherein the antenna pattern for driving is arranged at such a position that the antenna pattern for driving does not block light that forms an image displayed by the display panel.

6. The display device according to claim 1,
wherein, in a case where wireless communication is performed with a device as a wireless communication target that has an antenna element having a resonance frequency approximately equal to the predetermined carrier wave frequency $f0$,
the antenna pattern for driving has a resonance frequency of $f1$ [Hz] when the antenna pattern for driving is connected with the matching unit, and
each of the antenna pattern for propagation has a resonance frequency of $f2$ [Hz] when each of the antenna patterns for propagation is connected with a capacitor having a predetermined capacitance value,
wherein the predetermined carrier wave frequency $f0$, the resonance frequency $f1$ of the antenna pattern for driving, and the resonance frequency $f2$ of each of the antenna patterns for propagation satisfy:

$f0<f1<f2$, or $f0<f2<f1$, or $f1<f2<f0$, or $f2<f1<f0$.

7. The display device according to claim 6,
wherein the resonance frequency f1 of the antenna pattern for driving and the resonance frequency f2 of the antenna pattern for propagation satisfy:

13.56−4.52 [MHz]≤f1≤13.56+4.52 [MHz], and 13.56−4.52 [MHz]≤f2≤13.56+4.52 [MHz].

8. The display device according to claim 1,
wherein the antenna pattern for driving is formed with a transparent electrode that has a transmittance equal to or higher than a predetermined value.

9. The display device according to claim 1,
wherein the antenna pattern for driving is formed with a conductor pattern that is formed by arranging a thin line made of a metal in a mesh form.

10. The display device according to claim 1,
wherein the antenna pattern for propagation are formed with a transparent electrode that has a transmittance equal to or higher than a predetermined value.

11. The display device according to claim 1,
wherein the antenna patterns for propagation are formed with a conductor pattern that is formed by arranging a thin line made of a metal in a mesh form.

12. The display device according to claim 1,
wherein the antenna pattern for driving is disposed on the same plane on which the antenna patterns for propagation are disposed.

13. A display device comprising:
a display panel for displaying an image;
an antenna pattern for driving;
a matching unit configured to perform impedance matching adjustment with respect to the antenna pattern for driving;
an antenna driving unit configured to drive the antenna pattern for driving, at a predetermined carrier wave frequency f0; and
at least two an antenna patterns for propagation,
   each of the antenna patterns for propagation and is arranged so that at least a part of each of the antenna patterns for propagation is included in a display area of the display panel when viewed in a plan view, at such a position that each of the antenna patterns for propagation can be electromagnetically coupled with the antenna pattern for driving,
wherein, the antenna pattern for driving and the antenna patterns for propagation are disconnected with each other, the antenna patterns for propagation are disconnected with each other,
each of the antenna patterns for propagation is formed in a spiral pattern, and none of the antenna patterns for propagation is wired with the antenna driving unit,
in a case where wireless communication is performed with a device as a wireless communication target that has an antenna element having a resonance frequency approximately equal to the predetermined carrier wave frequency f0,
the antenna pattern for driving has a resonance frequency of f1 [Hz] when the antenna pattern for driving is connected with the matching unit,
each of the antenna patterns for propagation has a resonance frequency of f2 [Hz] when each of the antenna patterns for propagation is connected with a capacitor having a predetermined capacitance value,
the predetermined carrier wave frequency f0, the resonance frequency f1 of the antenna pattern for driving, and the resonance frequency f2 of each of the antenna patterns for propagation satisfy:

f0<f1<f2, or f0<f2<f1, or f1<f2<f0, or f2<f1<f0, and the antenna patterns for propagation are disposed on a same plane.

14. The display device according to claim 13,
wherein the resonance frequency f1 of the antenna pattern for driving and the resonance frequency f2 of the antenna patterns for propagation satisfy:

13.56−4.52 [MHz]≤f1≤13.56+4.52 [MHz], and 13.56−4.52 [MHz]≤f2≤13.56+4.52 [MHz].

15. The display device according to claim 13,
wherein the antenna pattern for driving is disposed on the same plane on which the antenna patterns for propagation are disposed.

* * * * *